United States Patent
Poon et al.

(10) Patent No.: US 9,036,223 B2
(45) Date of Patent: May 19, 2015

(54) SYSTEMS AND METHODS FOR EDGE DETECTION DURING AN IMAGING OPERATION

(75) Inventors: Yarn Chee Poon, Singapore (SG); Chuan Wai Wong, Singapore (SG); Whee Cheng Ong, Singapore (SG)

(73) Assignee: Hewlett-Packard Development Company, L.P., Houston, TX (US)

( * ) Notice: Subject to any disclaimer, the term of this patent is extended or adjusted under 35 U.S.C. 154(b) by 740 days.

(21) Appl. No.: 13/129,135

(22) PCT Filed: Nov. 13, 2008

(86) PCT No.: PCT/US2008/083305
§ 371 (c)(1),
(2), (4) Date: May 13, 2011

(87) PCT Pub. No.: WO2010/056238
PCT Pub. Date: May 20, 2010

(65) Prior Publication Data
US 2011/0216378 A1    Sep. 8, 2011

(51) Int. Cl.
*H04N 1/04* (2006.01)
*G06K 9/20* (2006.01)
*G06T 7/00* (2006.01)
(Continued)

(52) U.S. Cl.
CPC ............ *G06K 9/2054* (2013.01); *G06T 7/0085* (2013.01); *G06T 7/2053* (2013.01); *G06T 2207/10008* (2013.01); *H04N 1/00681* (2013.01); *H04N 1/00748* (2013.01); *H04N 1/00753* (2013.01); *H04N 1/00758* (2013.01); *H04N 1/38* (2013.01)

(58) Field of Classification Search
CPC .............. H04N 1/00681; H04N 1/193; H04N 2201/00766; H04N 2201/00756; H04N 1/1017

USPC ......... 358/488, 486, 474, 497, 464–466, 449; 382/291
See application file for complete search history.

(56) References Cited

U.S. PATENT DOCUMENTS 4,713,550 A    12/1987    Anzai et al.
4,954,846 A    9/1990    Matsuo et al.
(Continued)

FOREIGN PATENT DOCUMENTS

| EP | 1096784 | 2/2001 |
|---|---|---|
| JP | 06-162190 | 6/1994 |
| JP | H06162190 A | 6/1994 |
| JP | 09-305700 | 11/1997 |
| JP | H09305700 A | 11/1997 |

(Continued)

OTHER PUBLICATIONS

International Searching Authority, International Search Report and The Written Opinion, 10 pages, Jul. 2009.

(Continued)

*Primary Examiner* — Cheukfan Lee
(74) *Attorney, Agent, or Firm* — Trenner Law Firm, LLC

(57) ABSTRACT

Systems and methods for edge detection during an imaging operation are disclosed. In an exemplary implementation, a method may include subdividing an imaging area into a plurality of border detection zones. The method may also include scanning the imaging area including media to be scanned to obtain optical data for each of the plurality of border detection zones. The method may also include identifying at least one edge of the media based on change in the optical data between directly adjacent border detection zones, where the change indicates detection of a moiré pattern.

20 Claims, 10 Drawing Sheets

(51) Int. Cl.
  *G06T 7/20* (2006.01)
  *H04N 1/00* (2006.01)
  *H04N 1/38* (2006.01)

(56) References Cited

U.S. PATENT DOCUMENTS

| | | | |
|---|---|---|---|
| 5,036,354 A | | 7/1991 | Miyamoto |
| 5,384,621 A * | | 1/1995 | Hatch et al. .............. 399/42 |
| 5,491,759 A | | 2/1996 | Nagao et al. |
| 5,805,970 A | | 9/1998 | Kasamatsu |
| 6,064,778 A | | 5/2000 | Pasco et al. |
| 6,134,027 A | | 10/2000 | Lee |
| 6,912,325 B2 * | | 6/2005 | Rombola et al. ............ 382/289 |
| 6,930,804 B2 | | 8/2005 | Farrell |
| 7,515,772 B2 * | | 4/2009 | Li et al. ................ 382/289 |
| 7,688,477 B2 * | | 3/2010 | Ikeno et al. ............. 358/449 |

FOREIGN PATENT DOCUMENTS

| | | | |
|---|---|---|---|
| JP | 2000232562 A | * | 8/2000 |
| JP | 2002-197449 | | 7/2002 |
| JP | 2002197449 A | | 7/2002 |
| JP | 2005165822 A | | 6/2005 |
| JP | 2005-165822 | | 6/2006 |

OTHER PUBLICATIONS

International Preliminary Report on Patentability received in PCT Application No. PCT/US2008/083305, May 26, 2011, 5 pages.
International Search Report & Written Opinion received in PCT Application No. PCT/US2008/083305, Jul. 30, 2009, 10 pages.
Standardization Committee of the Camera & imaging Products Association, "Resolution Measurement Methods for Digital Cameras," CIPA DC-003-Transiation-2003, Dec. 17, 2003, <http://www.cipa.jp/std/documents/e/DC-003_e.pdf>.

* cited by examiner

PRIOR ART

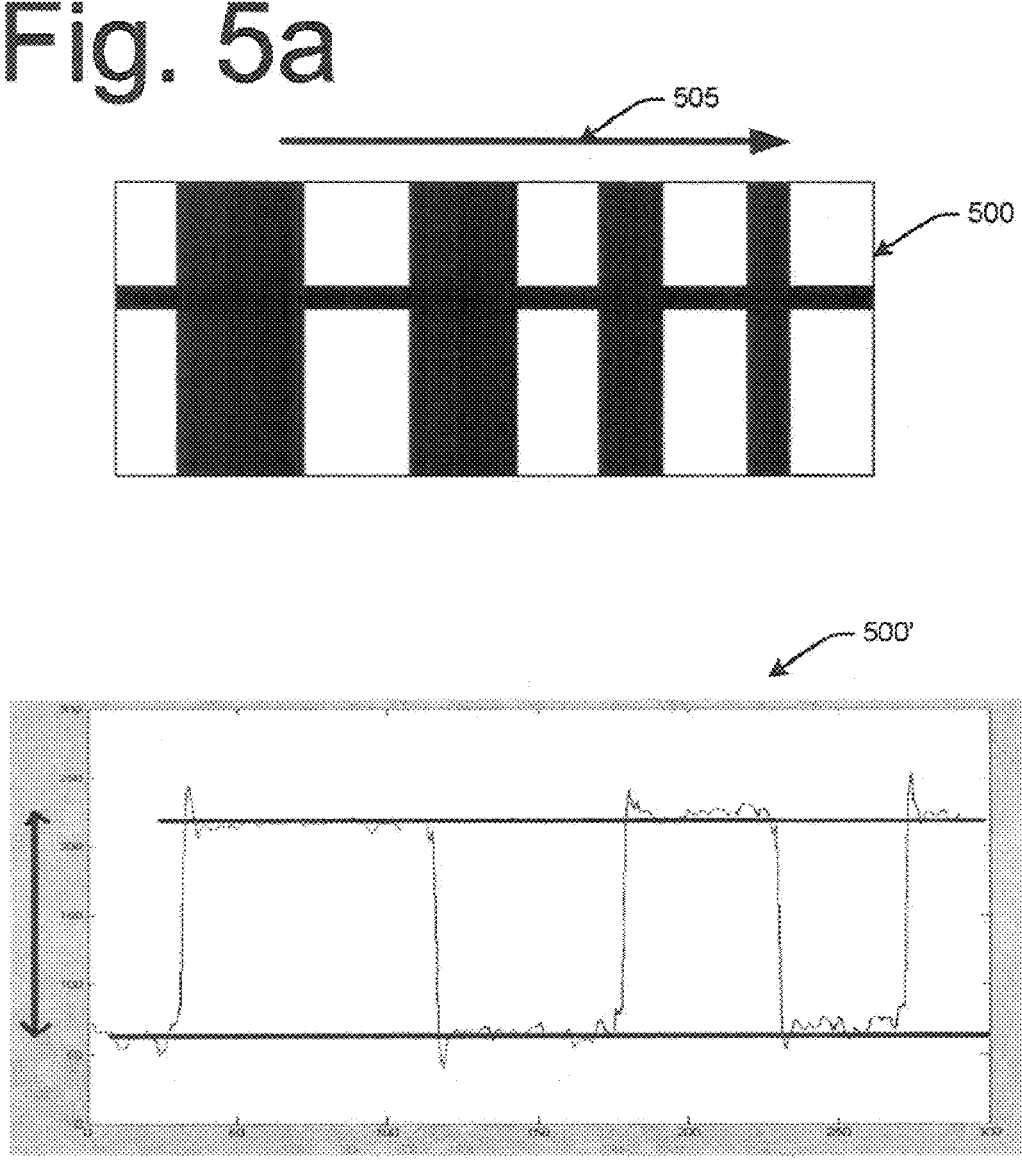

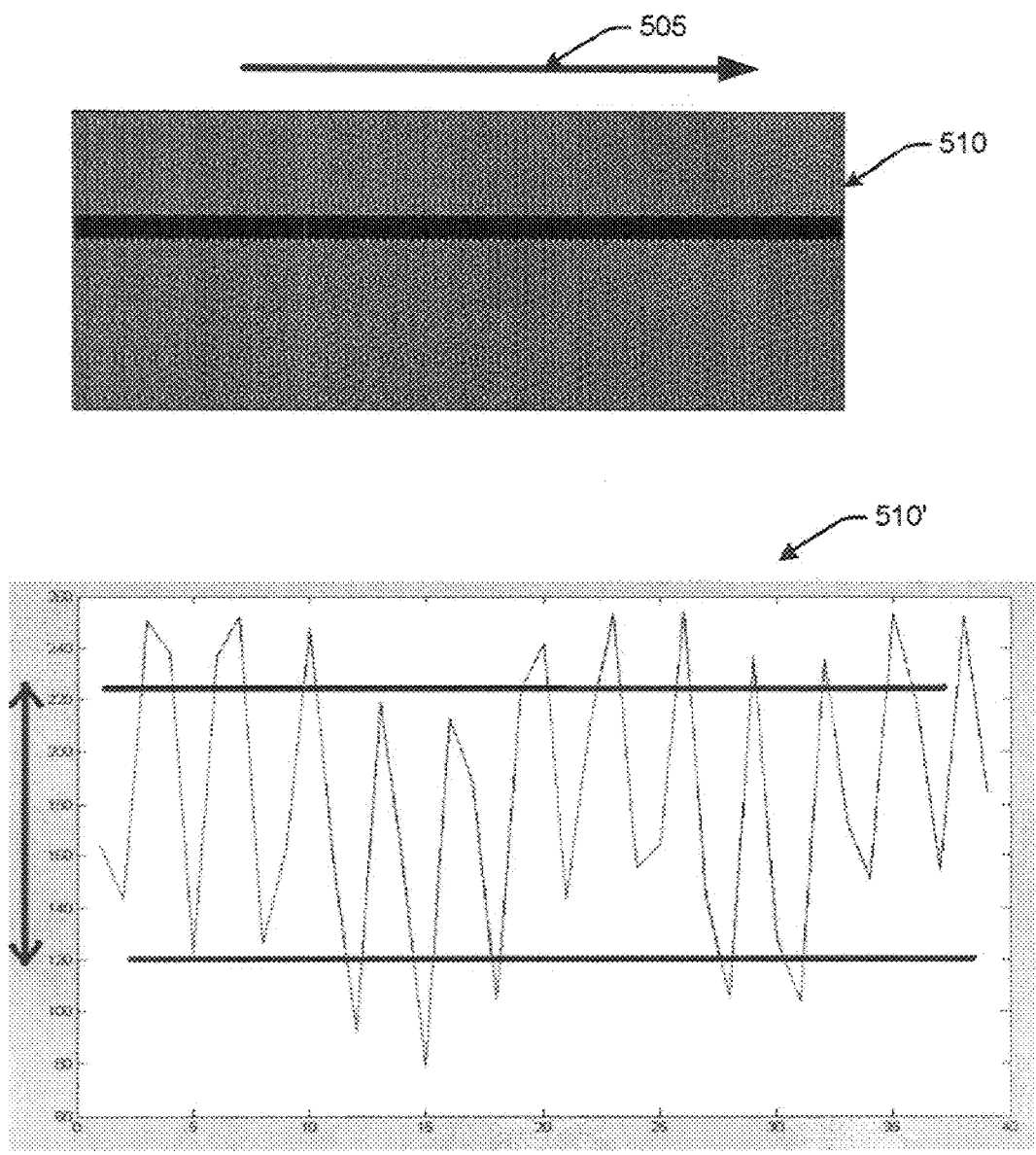

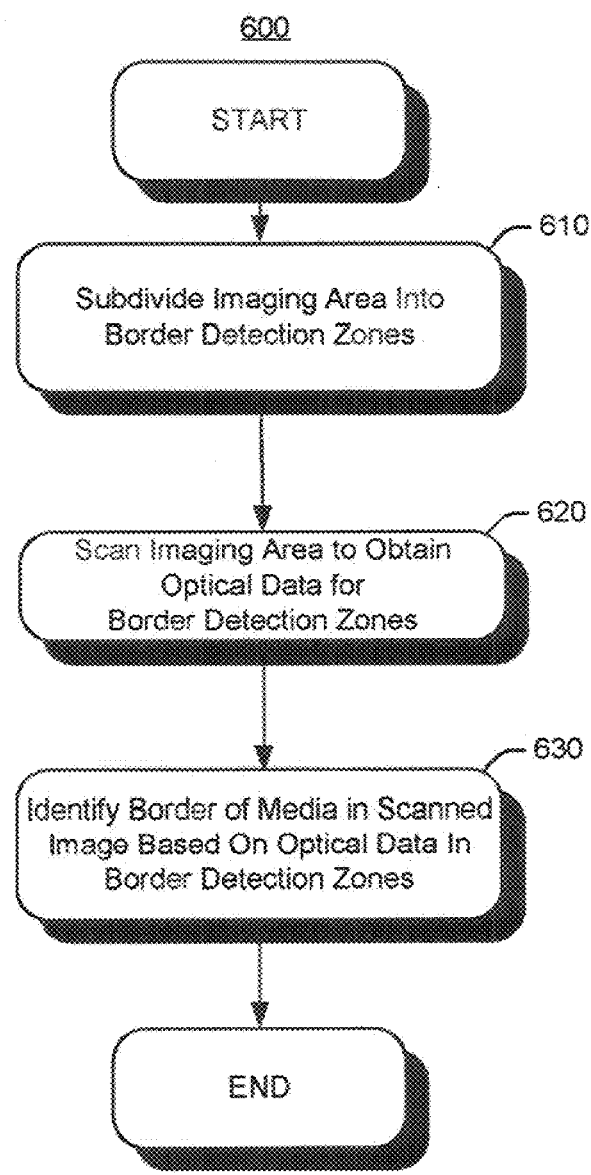

SYSTEMS AND METHODS FOR EDGE DETECTION DURING AN IMAGING OPERATION

BACKGROUND

Imaging devices, such as scanners, copiers, facsimile machines and multipurpose machines, are commercially available for converting tangible images (e.g., documents, photographs) into electronic images. These imaging devices operate by generating light from a light source in the imaging device and reflecting this light off of the surface of the tangible image. The reflected light is collected on an array of photosensitive elements (e.g., a charge coupled device (CCD)), which convert the reflected light into electronic signals representing the image.

The media may be placed in a desired position on the imaging surface (or platen) and the lid closed prior to starting the scanning operation. The platen is often oversized to accommodate a wide variety of different sizes of media (e.g., ranging in size from business cards and photographs to letter and legal-sized paper). As a result, when scanning media that is smaller than the platen size, the resulting scanned image includes "white-space" outside of the borders of the media that was scanned. This white-space then has to be cropped from the scanned image.

The scanned image may be cropped manually. Cropping images is well-known in the image processing art, and typically involves the user clicking and dragging a cursor around the scanned image to form a box along the borders of the scanned image. Software then removes the areas outside of the box from the scanned image to form the final image. However, this approach typically requires a separate computer for interfacing with the user and executing the software.

Algorithms may also be implemented by the imaging device to automatically crop the scanned image following the scanning operation. These algorithms analyze the scanned image and "assume" that blank space in the scanned image (e.g., predetermined number of blank lines) corresponds to white-space, which is then cropped from the scanned image. However, these algorithms are processing-intensive and can be time consuming to execute, thereby slowing the overall scanning operation. In addition, these algorithms can be prone to errors. For example, if the user is scanning a letter-size document having only a few lines of text, the algorithm may crop all but the area having the text, resulting in a much smaller scanned image than the letter-size document which was imaged.

Alternatively, the user may manually specify the size of the media being scanned, either before or after the scanning operation. Accordingly, only the specified is scanned. In this case, the media needs to be properly aligned on the platen surface so that the entire media is scanned. Although most imaging devices include an icon or other instructional language (e.g., the product documentation) illustrating for the user how to orient the media on the platen, this approach is still prone to user error. In addition, while the manufacturer may specify common sizes of media (e.g., letter size, legal size, A4, business card size, etc.), it is impracticable to specify all possible sizes of media that a user may wish to image. In addition, the user would need to measure the media if the media is not a common or well-recognized size, thereby adding a cumbersome step for the user.

In each of these attempts to accommodate different size media, the user may become frustrated when the resulting scanned image does not meet their expectations and the user has to rescan the media.

BRIEF DESCRIPTION OF THE DRAWINGS

FIGS. 5a-b illustrate using aliasing for edge detection of media having predominantly black-and-white lines in the scanned image (e.g., a text document).

FIG. 6 is a flowchart illustrating exemplary operations for edge detection.

DETAILED DESCRIPTION

Systems and methods of edge detection during an imaging operation are disclosed. The systems and methods may implement a pattern of high frequency lines (e.g., disposed on the inside of a lid or cover of an imaging device). This pattern is placed over the platen during a scanning operation. Scanning this pattern of high frequency lines results in what is known as a moiré effect (or spatial aliasing) in the scanned image.

A moiré effect is caused by the imaging system being unable to sufficiently resolve the high frequency lines as separate lines. However, this effect only occurs in the scanned image directly exposed to the high frequency lines. The remainder of the scanned image (i.e., that portion including an image of the media being scanned) is unaffected. Accordingly, any area of the scanned image exhibiting a moiré effect may be considered to be white-space, and used to identify the borders of media being scanned.

Subsequent processing operations may then be implemented to crop the scanned image along the borders of the media without the need for user input or other algorithms for detecting white space.

Exemplary Systems

Figure 1:
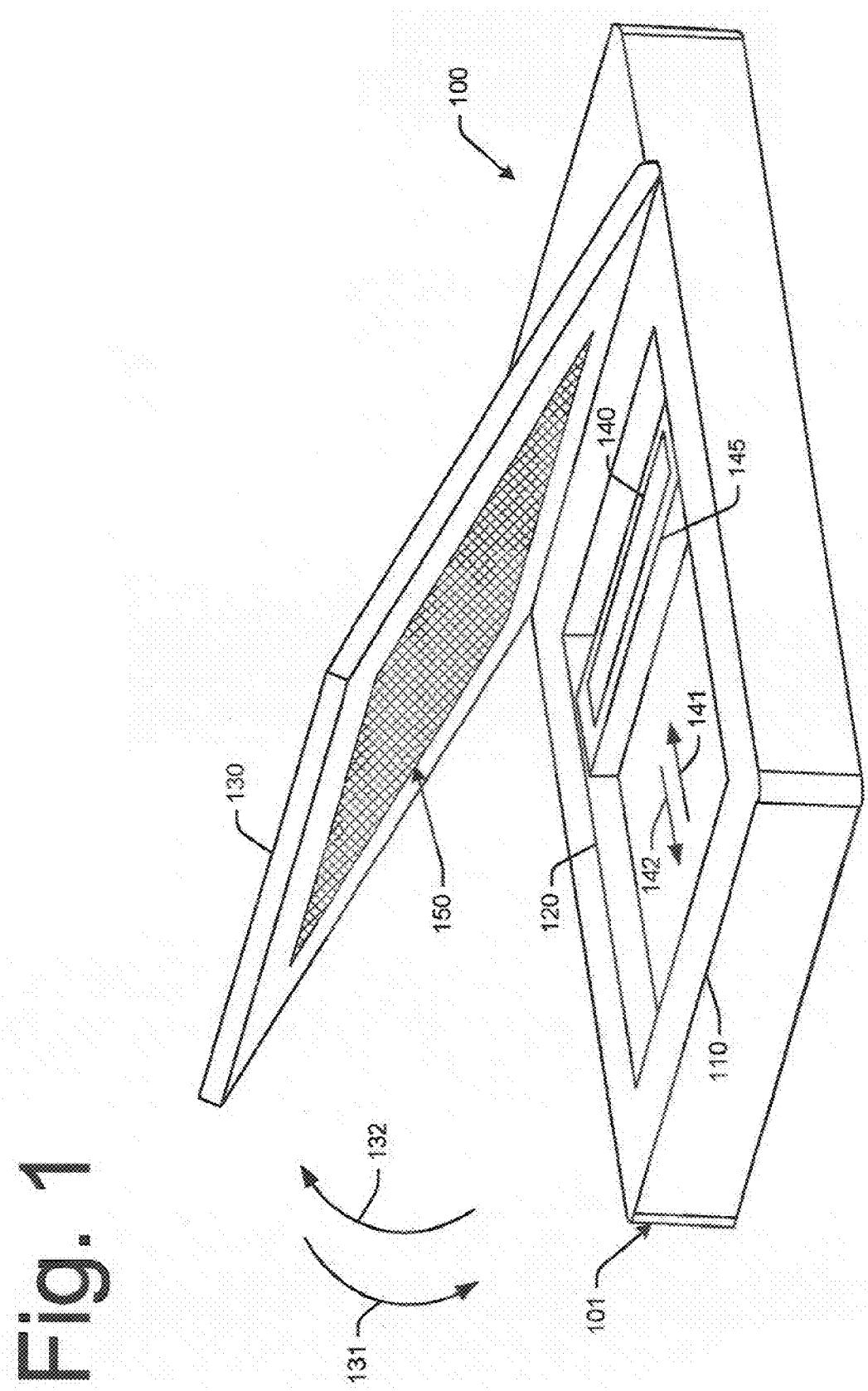
FIG. 1 is a perspective view of an exemplary imaging system which may implement edge detection during an imaging operation.

FIG. 1 is a perspective view of an exemplary imaging system which may implement edge detection during an imaging operation. An exemplary transparency imaging system 100 may comprise an imaging device 101, such as a flatbed scanner. Although the systems and methods are described herein with reference to a flatbed scanner for purposes of illustration, it is understood that the systems and methods are not limited to use with flatbed scanners. For example, imaging device 101 may comprise handheld scanners, copiers, facsimile machines, multipurpose machines, digital imagine machines, and other electronic devices for capturing digital images.

In an exemplary embodiment, imaging device 101 comprises a housing 110 having an imaging surface 120 (e.g., glass platen). A cover 130 may also be provided to open and close over the imaging surface 120 (e.g., in the directions illustrated by arrows 131 and 132). The cover 130 is shown in an open position in FIG. 1.

Imaging device 101 may also comprise a light source 140 mounted on a carriage 145 within the housing 110 beneath the imaging surface 120. Carriage 145 is operable to move the light source 140 (e.g., in the directions illustrated by arrows 141 and 142) to illuminate object(s) placed adjacent the imaging surface 120.

The light source may be a fluorescent or other white light source, or an LED light source where individual colored LED's are individually strobed to achieve the desired RGB color exposure. A diffuser (e.g., frosted glass, not shown) may also be provided between the light source and the media. Diffusers generally function to diffuse light emanating from the light source and distribute the light evenly over media platen surface.

It will be readily appreciated that imaging device 101, such as the flatbed scanner shown in FIG. 1 and described above, may also be provided with various ancillary devices. For example, imaging devices are often equipped with automatic document feeders, paper trays, I/O ports, output trays, LCD displays, and/or keypads to name only a few ancillary devices. These and other ancillary devices are commonly associated with imaging devices, and therefore are not shown or described herein as their description is not needed to fully understand or practice the invention.

The foregoing description of imaging device 101, and the flatbed scanner in particular, is provided as an illustration of one embodiment of an environment in which the systems and methods may be implemented. It should be understood, however, that the systems and methods may be used in conjunction with any of a wide range of other types and configurations of imaging devices that are now known or that may be developed in the future.

To operate the imaging device, a user may open the cover 130 from the imaging device 101 and position the media on the imaging surface 120. In an exemplary embodiment, this involves positioning the media directly adjacent the imaging surface 120 and lowering the cover 130 over the media on the platen surface.

During operation, light originating at the light source is projected through the platen and onto the media being scanned. Light is reflected from the media and passes through the imaging surface 120 and onto photosensitive elements (e.g., provided on the carriage 145). These photosensitive elements, are the same as those which already exist on conventional carriages 145 for receiving light reflected off of an opaque object being imaged on the imaging surface 120. An arrangement of optional lenses and mirrors may be provided to focus the light onto the photosensitive elements.

A pattern 150 may be provided on the cover 130. The pattern 150 may be provided permanently on the cover 130. Alternatively, the pattern 150 may be interchangeably provided on the cover 130, e.g., positioned on the cover 130 by an end-user, or generated automatically by an electronic display. For example, different patterns 150 may be interchangeably provided for different types of media, different types of imaging operations (e.g., color versus black-and-white), etc.

Although any suitable pattern may be implemented, in an exemplary embodiment the pattern 150 may include a high frequency of fine lines. The pattern 150 may be selected such that when imaged or scanned, the pattern 150 causes a moiré effect in the scanned image. When media is placed on the imaging surface 120, a portion of the pattern 150 is obstructed, and hence any area of the scanned image exhibiting this moiré effect corresponds to what would otherwise be considered white-space outside the borders of the media being scanned.

Subsequent processing operations may then be implemented to automatically crop the scanned image along the borders of the media. These and other aspects and operations will be described in more detail below with reference to examples of imaging operations.

Before continuing, it is noted that imaging devices and the operation of these devices in general is understood and therefore further description is not necessary for a full understanding of, or to practice the systems and methods disclosed herein. It is also noted that the specific configurations shown and described herein are only exemplary and not intended to be limiting. Other configurations are also contemplated and may depend on various design considerations.

Figure 2:
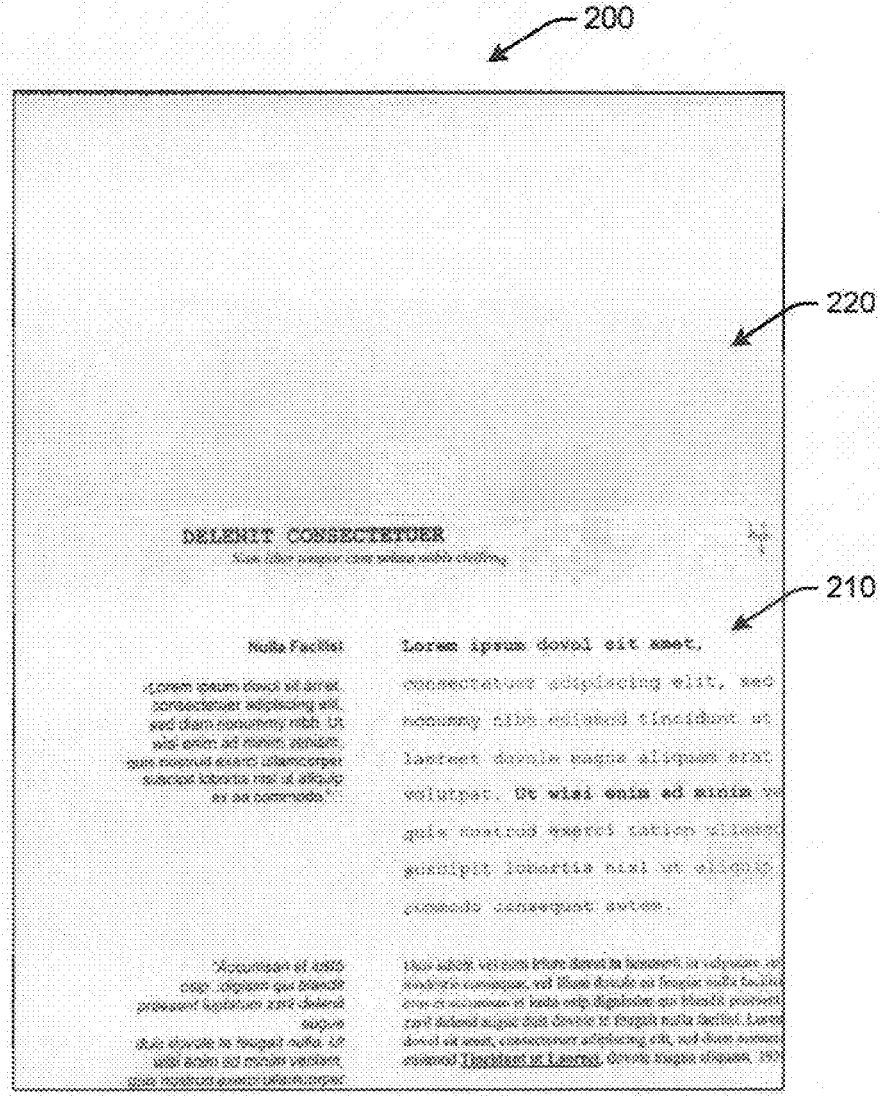
FIG. 2 is a plan view of a scanned image showing an example of an imaging operation without edge detection.

FIG. 2 is a plan view of a scanned image 200 showing an example of an imaging operation without using edge detection. In this example, the scanned media being scanned is smaller than the size of the imaging surface 120. Accordingly, the resulting scanned image 200 includes a portion 210 representing the scanned media and another portion representing undesired white-space 220.

Figure 3A:
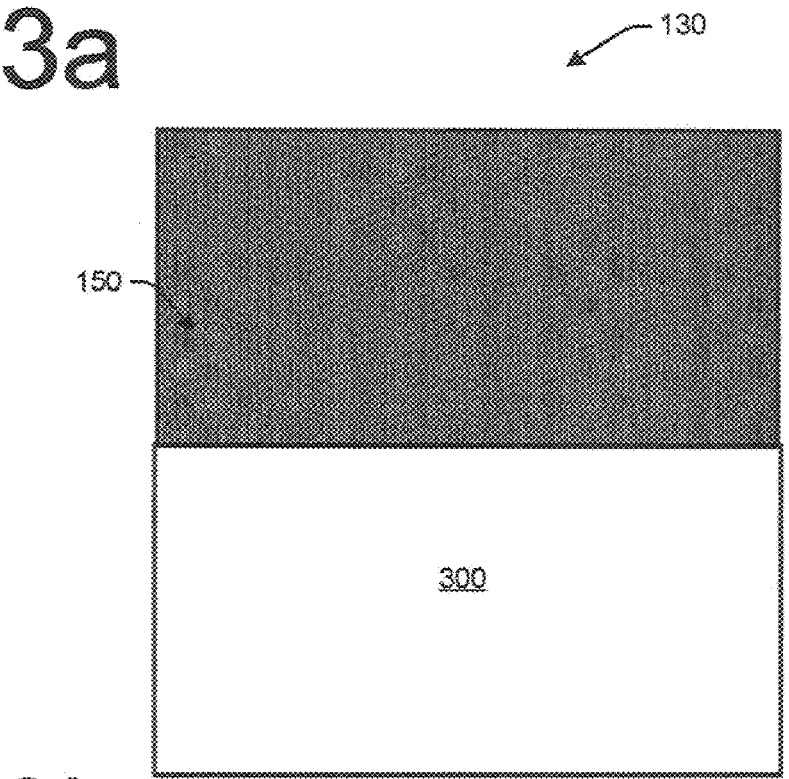
FIGS. 3a-b are plan views of different size media positioned adjacent a cover of an imaging device where the cover includes a pattern.
Figure 3B:
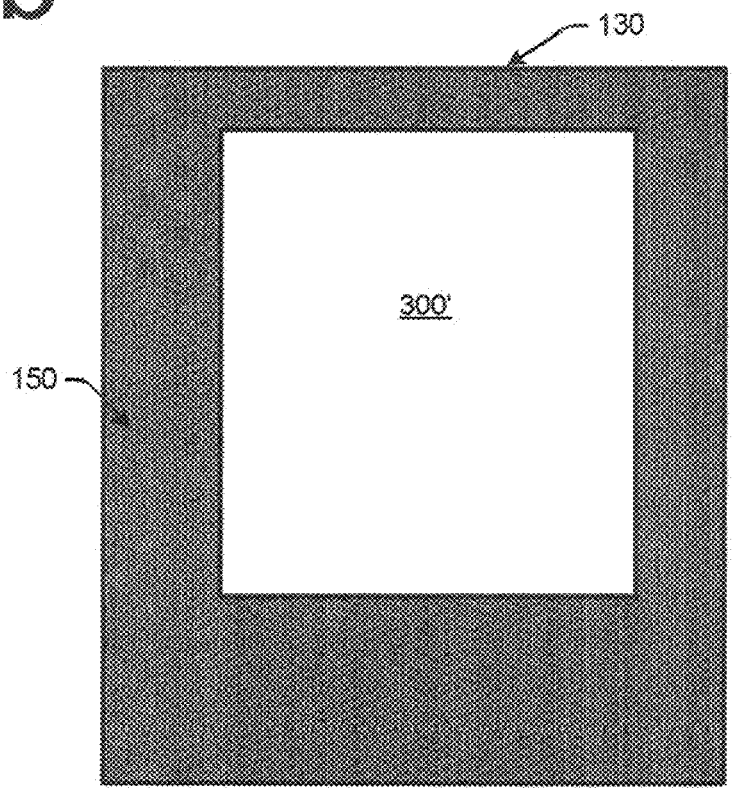

FIGS. 3a-b are plan views of different size media 300 and 300' positioned adjacent a cover 130 of an imaging device, where the cover 130' includes a pattern 150. It is noted that although specific media sizes and orientations are shown in FIGS. 3a-b, any size media which is smaller than the imaging surface may be used in any orientation. In an exemplary embodiment, the pattern 150 may generate a moiré effect that is visible in the resulting scanned images, which may be used to identify the borders of the media 300 or 300'.

Figure 4A:
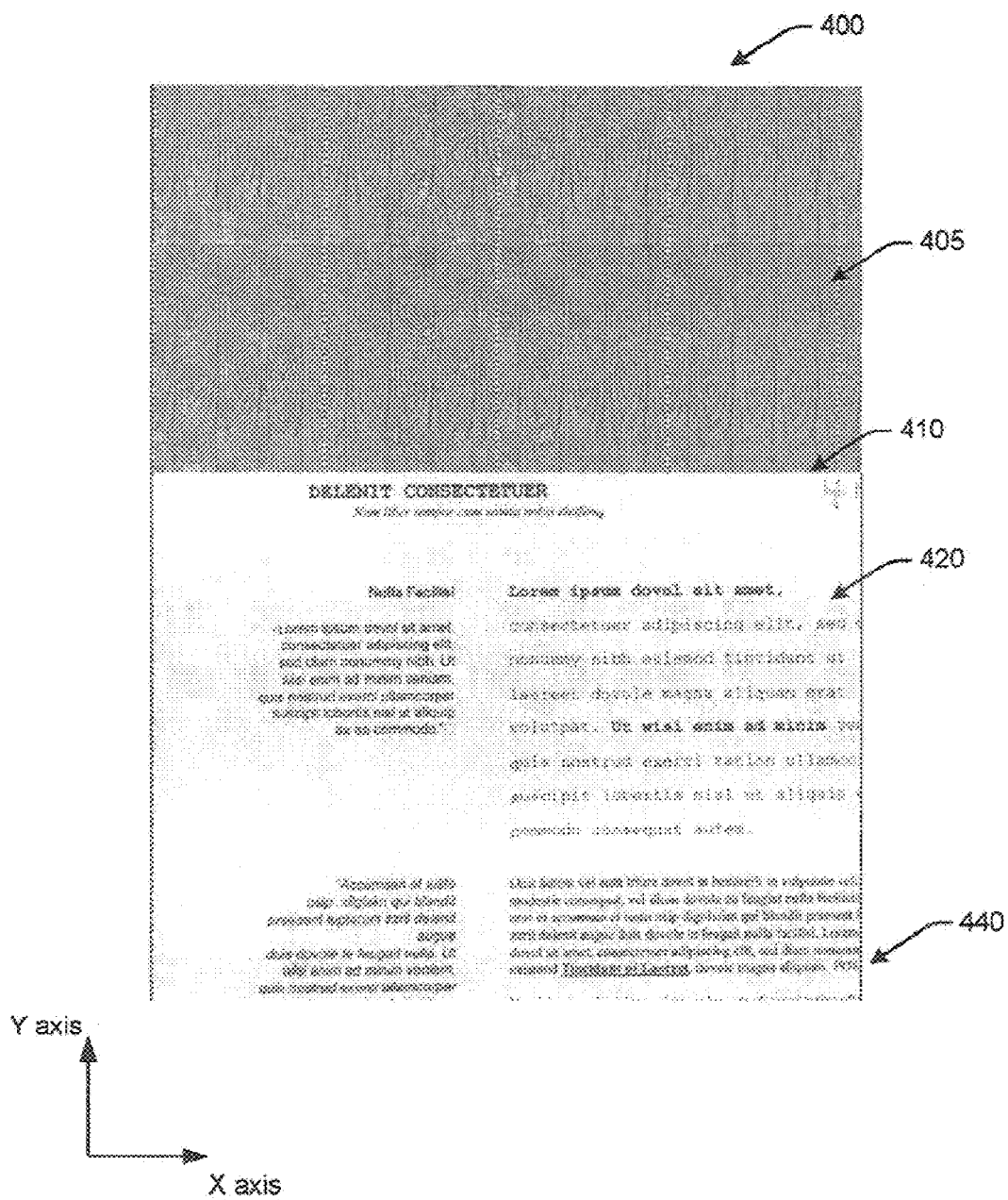
FIGS. 4a-c are illustrative of an exemplary imaging operation with edge detection.
Figure 4B:
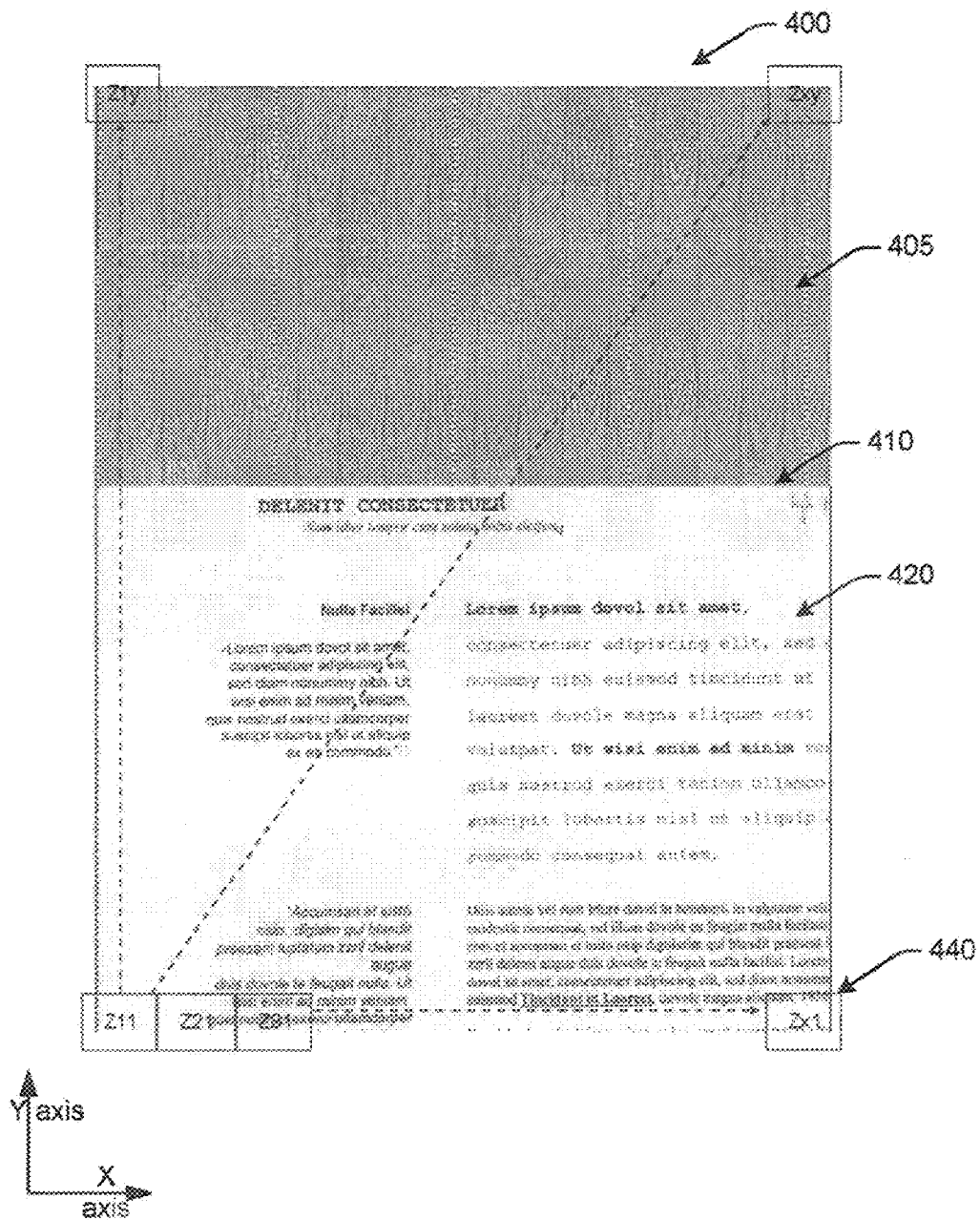
Figure 4C:
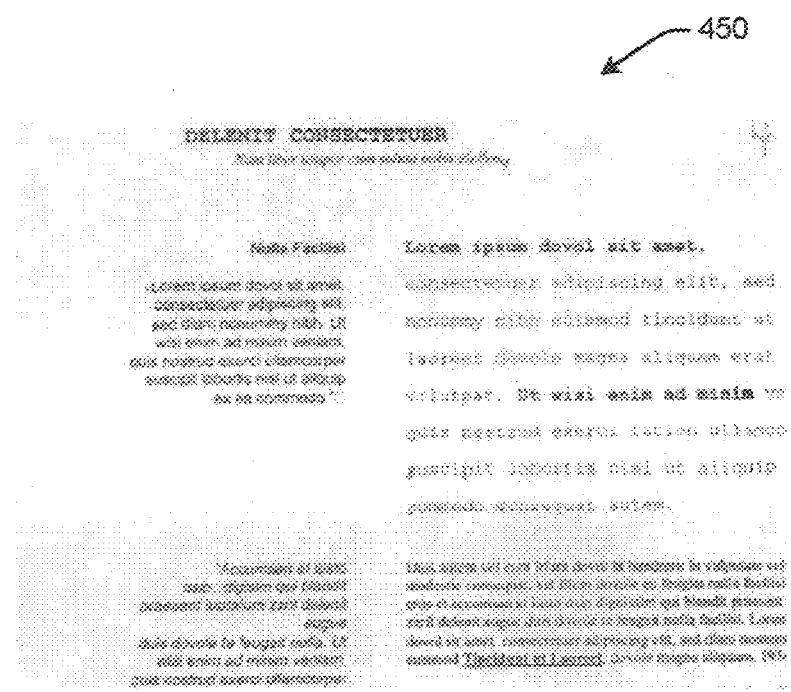

FIGS. 4a-c are illustrative of an exemplary imaging operation with edge detection. In FIG. 4a, a scanned image 400 is shown, e.g., corresponding to the media 300 being scanned in FIG. 3a. Also visible in FIG. 4a is the moiré effect 405 caused by the pattern 150 on the lid or cover of the imaging device.

During subsequent processing, the moiré effect 405 may be used to identify the borders 410 of the portion 420 of the scanned image corresponding to the media 300. In an exemplary embodiment, the scanned image 400 is subdivided into a plurality of edge detection zones. FIG. 4b shows exemplary edge detection zones 440. In this example, the edge detection zones 440 are designated Zxy, where "Z" represents a zone, "x" is the X-axis coordinate, and "y" is the Y-axis coordinate.

It will be readily apparent to those having ordinary skill in the art after becoming familiar with the teachings herein that any number, size, shape, and orientation of edge detection zones 440 may be implemented. For example, a larger number of smaller size edge detection zones (e.g., a pixel-by-pixel basis) will generally result in greater granularity in identifying borders 410. A smaller number of larger size edge detection zones (e.g., groups of pixels) will generally result in less granularity in identifying borders 410, but at faster processing times.

After identifying the borders 410, the white-space 405 may be cropped from the scanned image 400 so that only portion 420 of the scanned image 400 corresponding to the media 300 is in the final image 450, as shown in FIG. 4c.

Having generally described the process for using a moiré effect to identify borders of media in a scanned image and automatically crop white-space, exemplary methods for identifying the borders will now be explained in more detail with reference to the examples in FIGS. 5 and 6.

FIGS. 5a-b illustrate using aliasing for edge detection of media having predominantly black-and-white lines in the scanned image (e.g., a text document). In these examples, at least one edge or border of the media may be identified based on a change in the optical data between directly adjacent border detection zones. In an exemplary embodiment, logic may be implemented to characterize the scanned image for aliasing.

Aliasing occurs when a high frequency pattern is scanned. For example, an image with little or no high-frequency information may not exhibit aliasing. The contrast difference between black and white lines for non-aliased lines is pronounced. For example, the difference between the black and white lines in a typical text document is approximately 220 minus 60, or a gray level of about 160. This can be seen by the plot 500' corresponding to white and black lines 500 in FIG. 5a. The direction of scanning is illustrated in FIG. a by arrow 505.

On the other hand, if the image includes many high frequency edges (e.g., as in the pattern 150), then the image may exhibit significant aliasing. In the example shown in FIG. 5b, the difference in maximum and minimum gray level (or "contrast") is less than about 100, as the lines become finer and finer. This is illustrated in the plot 510' corresponding to a pattern of fine lines 510. Again, the direction of scanning is illustrated in FIG. 5b by arrow 505.

Accordingly analyzing the image data in each of the border detection zones for differences in contrast may be used to identify borders of the media being scanned. That is, if adjacent border detection zones show a change in contrast, this change may be considered to indicate a border.

Figure 5C:
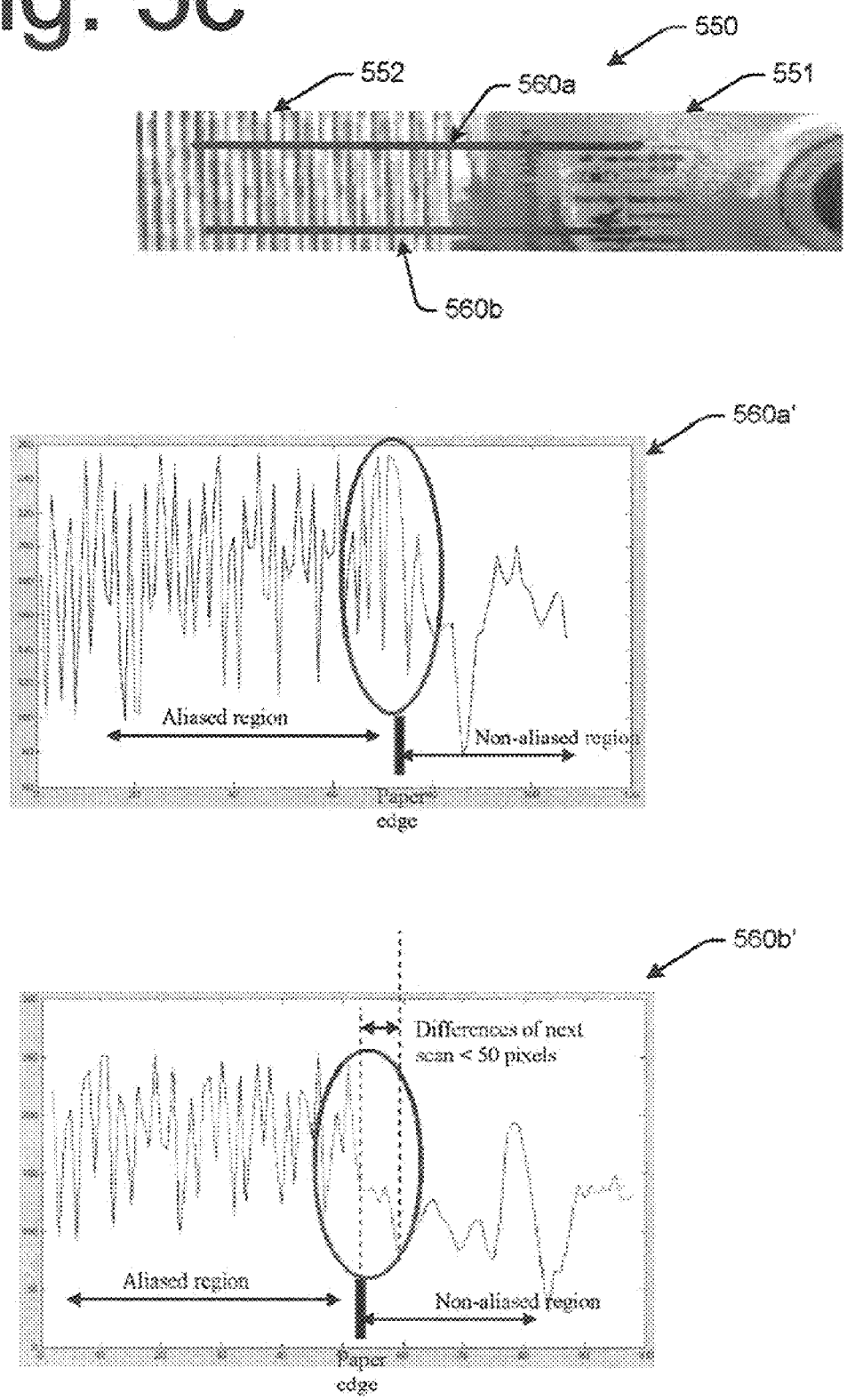
FIG. 5c illustrates using aliasing of another type of media that does not have predominantly black-and-white lines (e.g., a photograph).

FIG. 5c illustrates using aliasing for edge detection of another type of media that does not have predominantly black-and-white lines (e.g., a photograph). In FIG. 5c, a scanned image 550 is shown as it may include a portion of a photograph of a digital camera 551 and another portion 552 corresponding, to a pattern on the scanner cover.

In an exemplary embodiment, a so-called "peak-to-valley" method may be used for edge detection. In this example, two line profiles 560a and 560b are analyzed (although any suitable number of line profiles may be used). The image gray level for line profile 560a is shown by plot 560a'. The image gray level for line profile 560b is shown by plot 560b'. A change in the line profiles 560a and 560b of many peaks and valleys (or line slope) to fewer peaks and valleys corresponds to a change from an aliased portion of the image to a non-aliased portion of the image. That is, many peaks and valleys found close together (e.g., at least one peak and valley every 5 pixels) indicate aliasing, while fewer peaks and valleys found farther apart (one peak and valley more than 5 pixels apart) indicates a lack of aliasing.

The area where there is a change in contrast profile (or gray level profile) between the two line profiles 560a and 560b should also be relatively close (e.g., within about 50 pixels) near the edge of the image portion 551 to indicate a true border, as opposed to noise. For example, if line profile 560a changes between pixel 100 to 130, then line profile 560b should change between pixel 110 to 140.

In any event, logic for characterizing aliasing may be implemented as a comparator. Alternatively, the logic may be implemented with a table. In any event, techniques for characterizing aliasing are well-understood and may include 1) reading a gray level for each zone, 2) applying a non-linear function to amplify large differences and reduce or ignore smaller differences, 3) calculating contrast, and 4) comparing to a threshold to identify aliasing.

The techniques generally involve comparing at least one picture element (pixel) in a first border, detection zone with at least one pixel in a second border detection zone to discern a change between the two border detection zones. This process may be repeated for successive pairs of border detection zones to characterize aliasing in approximately real time.

In an exemplary embodiment, the border detection zones are divided across the x-axis (e.g., as shown in FIG. 4b). During scanning, the y-axis position of the zone is changed, for example, from $Z11$ to $Z12$ all the way to $Z1y$. After scanning, the contrast value (differences of gray value) are compared to detect the border. For example, if the contrast for border detection zone $Z11$ to $Zx1$ is about 140 gray value, and the contrast for border detection $Z13$ to $Zx3$ is about 90, then the document edge exists between border detection zones $Z11$ to $Zx1$ and $Z13$ to $Zx3$.

In another example for y-axis edge detection, the contrast for border detection zone $Z11$ to $Z51$ may be about 140 gray value (indicating the document), and for border detection zone $Z61$ to $Zx3$ is about 90 (indicating aliasing). Thus, the border exists between border detection zones $Z11$ to $Z51$ and $Z61$ to $Zx1$.

The comparison of border detection zones may be implemented in a variety of ways. For example, the magnitude of the zone-by-zone difference in brightness (luminance) may be computed. Alternatively, a zone-by-zone correlation (multiplication) may be performed. If the border detection zones compared are in directly adjacent locations, an indication may be inferred that there is a border between the zones.

Due to under-sampling, the gray level difference is small (approximately a 90 gray value) when aliasing occurs. In addition, a minimum gray level of about, 60 aids in filtering out false border detection (e.g., detecting blank areas within the document itself). Accordingly, an aliasing threshold may be set, e.g., between a 60 gray value and a 100 gray value, to identify the existence of borders in the scanned image.

It will be readily apparent to those having ordinary skill in the art after becoming familiar with the teachings herein, that the image(s) may also be characterized for specific types of aliasing. For example, if there are near horizontal lines, there may be aliasing in the vertical direction. Likewise, if there are near vertical lines, there may be aliasing in the horizontal direction. The image may also be analyzed for color aliasing. For example, if the image includes color artifacts.

In an exemplary embodiment, other input may also be used for identifying the borders, such as, but not limited to, factory-configured and/or user-configured settings, and other information about the media (e.g., paper type and/or image content).

Before continuing, it is noted that the plots shown in the figures and described above are provided only for purposes of illustration and are not intended to be limiting. For example, aliasing data is not limited to a two-dimensional plot, and may instead be expressed as a mathematical equation (or other suitable model) and/or data in any suitable data structure(s).

It is also noted that a pre-image may be implemented. A pre-image may be quickly scanned as a lower bit-depth for identifying the borders. Once the border has been identified, an actual image may be obtained. Using a pre-image enables faster processing by scanning for aliasing without concern for image quality. The pre-image(s) may be one or more of the pre-images already being implemented by the imaging device and/or the pre-image(s) may be obtained specifically for the purpose of identifying aliasing.

Exemplary Operations

FIG. 6 is a flowchart illustrating exemplary operations for edge detection. Operations 600 may be embodied as logic instructions on one or more computer-readable medium in the imaging device. When executed on a processor, the logic instructions implement the described operations. In an exemplary embodiment, the components and connections depicted in the Figures may be used for edge detection during an imaging operation.

In operation 610, an imaging area is subdivided into a plurality of border detection zones. The border detection zones may be predefined, or defined for each processing (e.g., by the user or based on other input or conditions).

In operation 620, the imaging area is scanned to obtain optical data for each of the border detection zones. Typically, operation 620 includes obtaining image data by scanning the entire imaging surface. However, operation 620 may also be implemented in a dynamic manner, wherein one or more line is scanned at a time and then processed. Based on the processing, the imaging operation may continue or abort (e.g., if a border has been detected).

In an exemplary embodiment, the change in the optical data is calculated in real-time during the imaging operation, and the imaging operation is stopped when an edge is detected along an axis of the imaging area perpendicular to the direction of movement of a light source used for the imaging operation.

In another exemplary embodiment, the change in the optical data is calculated in real-time during the imaging operation, and at least a portion of a light source used for the imaging operation is inactivated when an edge is detected (e.g., for energy savings).

In operation 630, at least one edge or border of the media is identified based on a change in the optical data between directly adjacent border detection zones. A change may be determined using one or more of the processing techniques described above for analyzing an image for aliasing. In addition, a change may be indicated by detection of a moiré pattern. In an exemplary embodiment, all edges of the media are identified regardless of orientation of the media during the imaging operation.

The operations shown and described herein are provided to illustrate exemplary embodiments of edge detection during an imaging operation. It is noted that the operations are not limited to the ordering shown. In addition, operations may terminate and/or restart at any point in time.

It is noted that the exemplary embodiments shown and described are provided for purposes of illustration and are not intended to be limiting. Still other embodiments are also contemplated.

The invention claimed is:

1. A method for edge detection during an imaging operation, comprising:
    subdividing an imaging area into a plurality of border detection zones;
    scanning the imaging area including media to be scanned to obtain optical data for each of the plurality of border detection zones; and
    identifying at least one edge of the media based on change in the optical data between directly adjacent border detection zones, where the change indicates detection of a moiré pattern,
    wherein identifying the at least one edge is by detecting high frequency lines in the moiré pattern unresolved as separate lines during the imaging operation, the moiré pattern indicating space outside of borders of a media being scanned.

2. The method of claim 1, wherein subdividing the imaging area into the plurality of border detection zones is along both an x-axis and a y-axis.

3. The method of claim 1, further comprising identifying all edges of the media regardless of orientation of the media during the imaging operation.

4. The method of claim 1, further comprising:
    calculating the change in the optical data in real-time during the imaging operation; and
    stopping the imaging operation when an edge is detected along an axis of the imaging area perpendicular to the direction of movement of a light source used for the imaging operation.

5. The method of claim 1, further comprising:
    calculating the change in the optical data in real-time during the imaging operation; and
    inactivating at least a portion of a light source used for the imaging operation when an edge is detected.

6. The method of claim 1, further comprising calculating the change in the optical data based on a resolution measurement calculation.

7. The method of claim 1, further comprising calculating the change in the optical data based on aliasing.

8. The method of claim 7, wherein a border of the media is indicated by abasing data meeting a predetermined threshold.

9. The method of claim 8, wherein a border of the media is indicated by abasing data being in a range of about 60 to 100 gray value.

10. The method of claim 1, wherein the border detection zones are configurable in size for selecting between finer border resolution and faster imaging operations.

11. The method of claim 1, wherein the moiré pattern causes a moiré effect indicating white space.

12. The method of claim 1, further comprising providing a pattern having a high frequency of fine lines, the pattern selected such that when the pattern is imaged or scanned, the pattern causes the moiré effect in a scanned image.

13. A system for edge detection during an imaging operation, comprising:
    an imaging area including a plurality of border detection zones;
    a light source and light detector configured to scan the imaging area including media to be scanned and to obtain optical data for each of the plurality of border detection zones; and
    program code executable to identify at least one edge of the media based on change in the optical data between directly adjacent border detection zones, where the change indicates detection of a moiré pattern,
    wherein the at least one edge is identified by detecting high frequency lines in the moiré pattern unresolved as separate lines during the imaging operation, the moiré pattern indicating space outside of borders of the media being scanned.

14. The system of claim 13, wherein the border detection zones are configurable in size for selecting between finer border resolution and faster imaging operations.

15. The system of claim 13, wherein the imaging area is subdivided into the plurality of border detection zones along an x-axis and a y-axis.

16. The system of claim 13, wherein the plurality of border detection zones are selected for identifying all edges of the media regardless of orientation of the media in the imaging area during the imaging operation.

17. The system of claim 13, wherein the program code is executable to:
    calculate the change in the optical data in real-time during the imaging operation; and
    stop the imaging operation when an edge is detected along an axis of the imaging area perpendicular to the direction of movement of a light source used for the imaging operation, or at least inactivate at least a portion of a light source used for the imaging operation when an edge is detected.

18. The system of claim 13, wherein the program code calculates the change in the optical data based on abasing, resolution measurement calculation, or a range of gray values.

19. The system of claim 13, wherein the moiré pattern causes a moiré effect indicating white space.

20. The system of claim 13, further comprising a cover with a pattern having a high frequency of fine lines, the pattern selected such that when the pattern is imaged or scanned, the pattern causes the moiré effect in a scanned image.

\* \* \* \* \*

UNITED STATES PATENT AND TRADEMARK OFFICE
CERTIFICATE OF CORRECTION

PATENT NO. : 9,036,223 B2  Page 1 of 1
APPLICATION NO. : 13/129135
DATED : May 19, 2015
INVENTOR(S) : Yarn Chee Poon et al.

It is certified that error appears in the above-identified patent and that said Letters Patent is hereby corrected as shown below:

In the claims

In column 8, line 17, in Claim 8, delete "abasing" and insert -- aliasing --, therefor.

In column 8, line 19, in Claim 9, delete "abasing" and insert -- aliasing --, therefor.

In column 8, line 60, in Claim 17, delete "during," and insert -- during --, therefor.

In column 9, line 2, in Claim 18, delete "abasing," and insert -- aliasing, --, therefor.

Signed and Sealed this
Twenty-ninth Day of December, 2015

Michelle K. Lee
*Director of the United States Patent and Trademark Office*